Jan. 9, 1951  J. J. HUNT  2,537,350
JIG CLAMP ARRANGEMENT
Filed Oct. 12, 1946  5 Sheets-Sheet 1
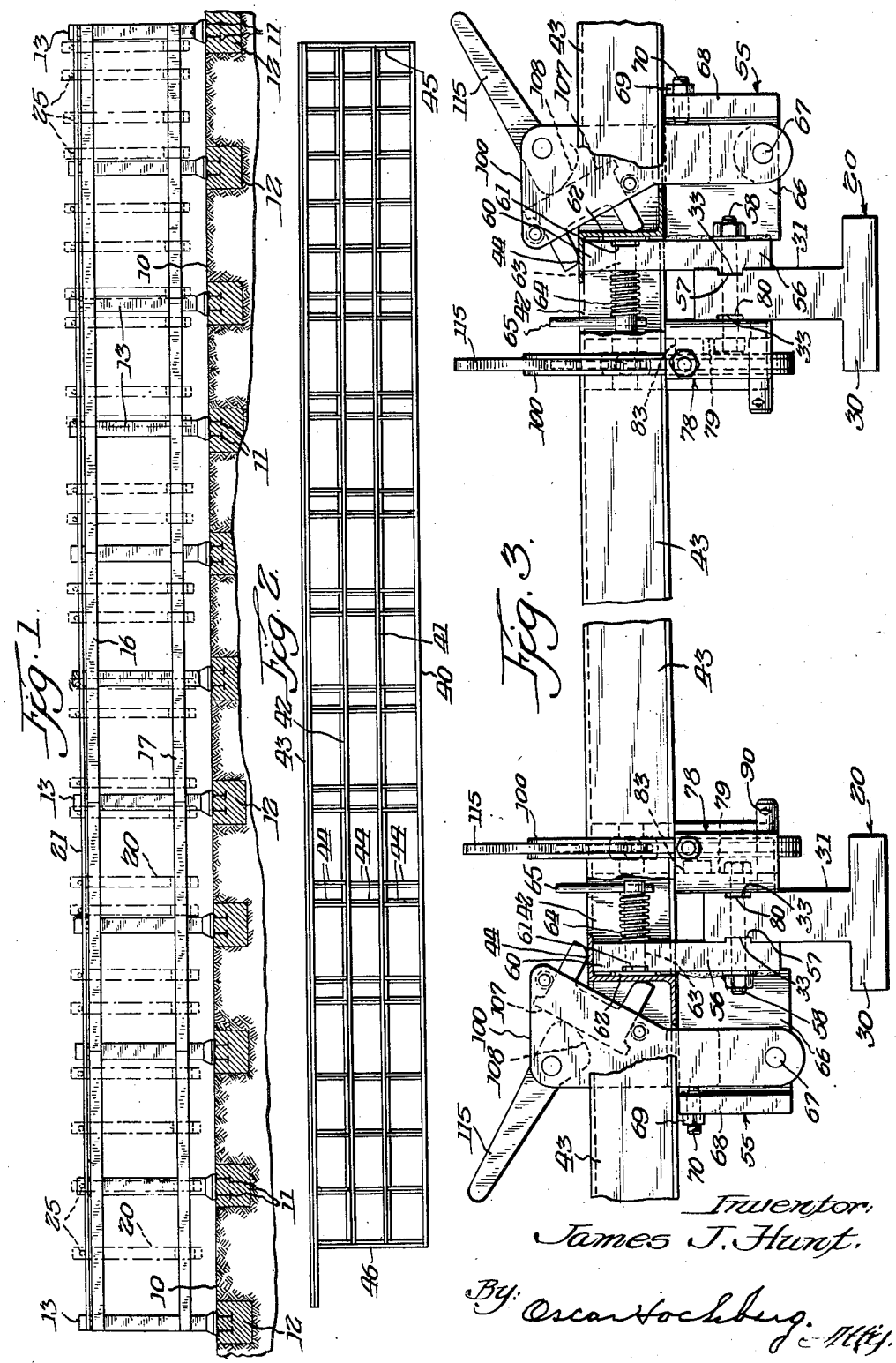
Inventor:
James J. Hunt,
By Oscar Hochberg

Fig. 4

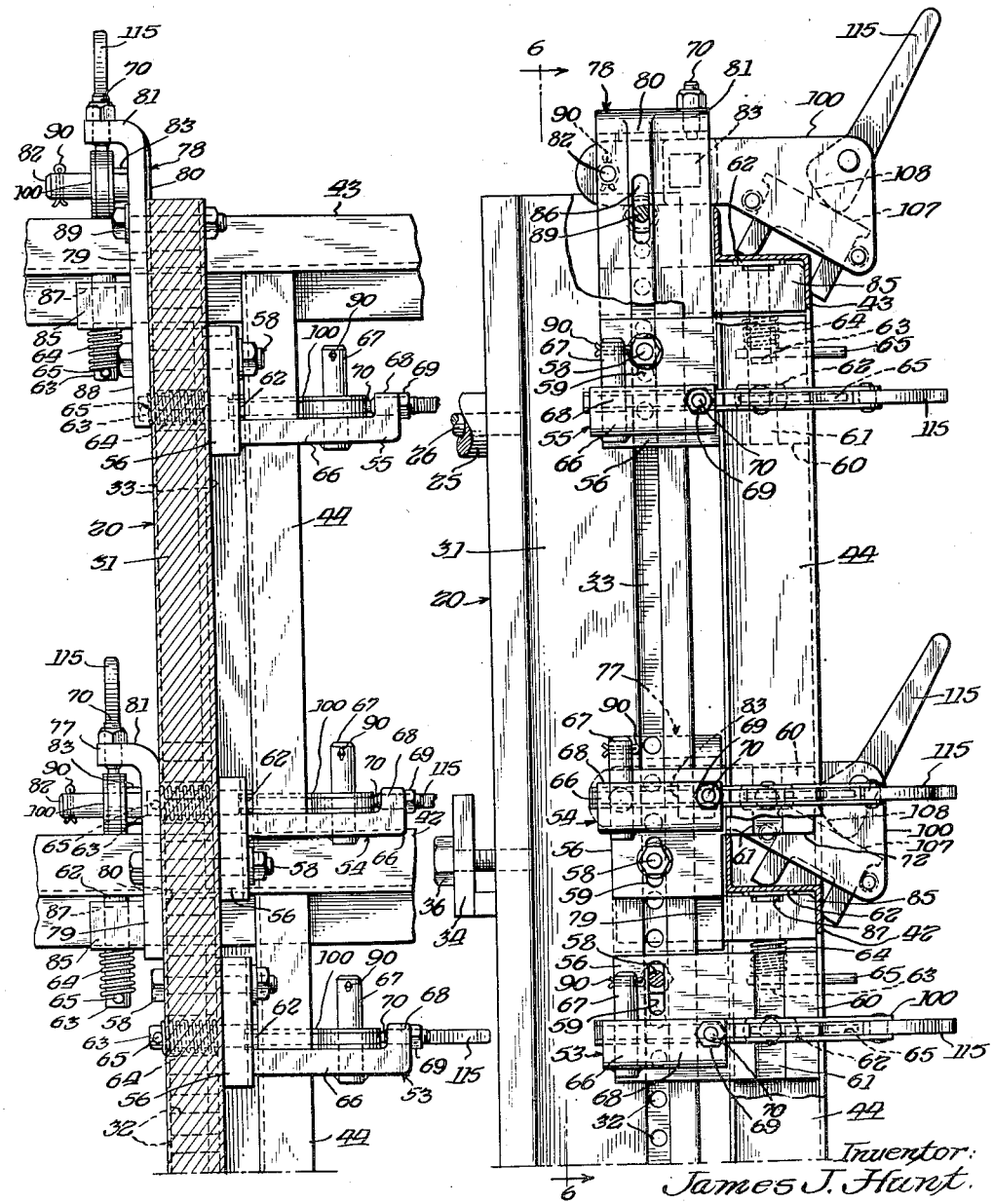

Jan. 9, 1951  J. J. HUNT  2,537,350
JIG CLAMP ARRANGEMENT
Filed Oct. 12, 1946  5 Sheets-Sheet 4
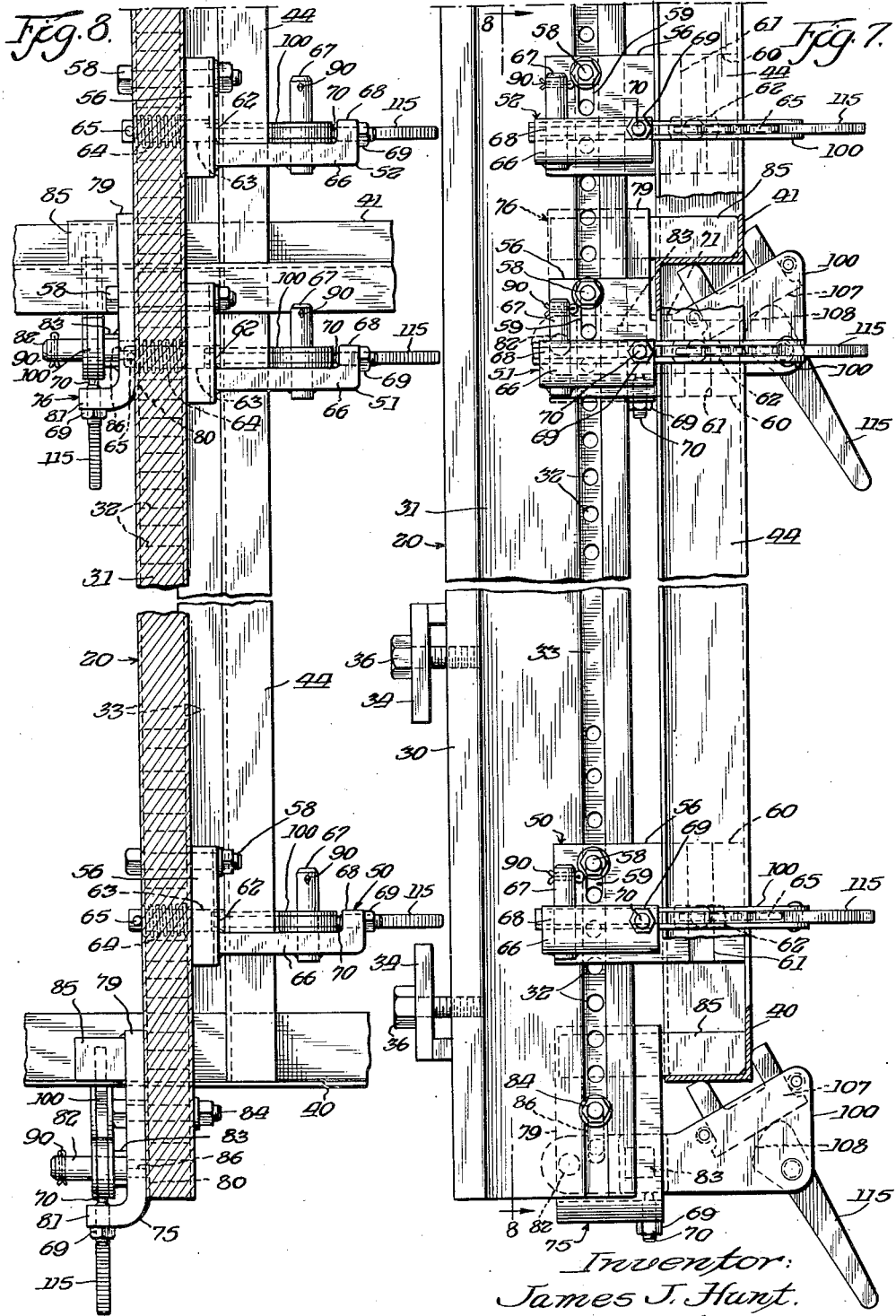
Inventor:
James J. Hunt.
By Oscar Hochberg. Atty.

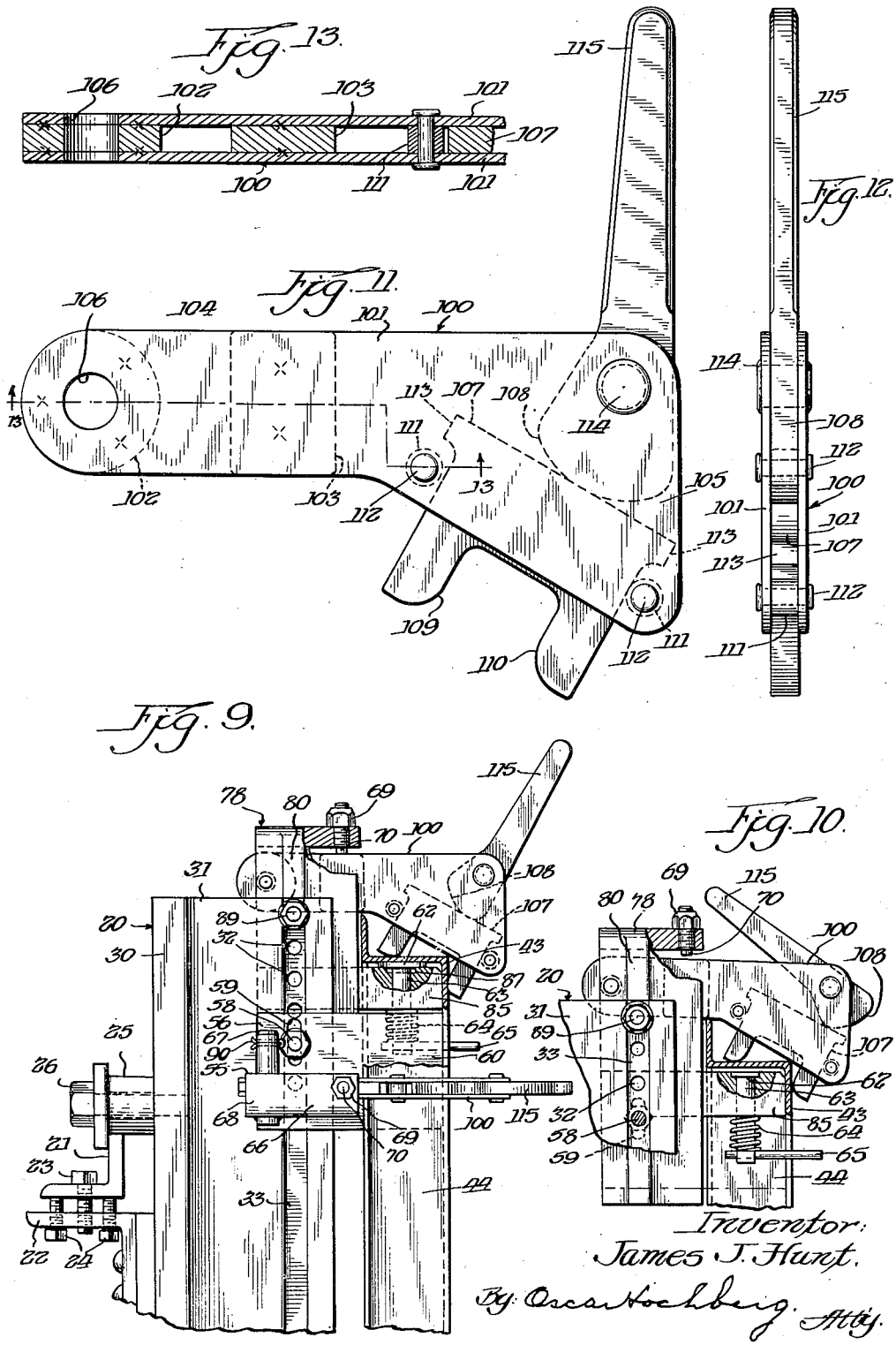

Patented Jan. 9, 1951

2,537,350

UNITED STATES PATENT OFFICE 2,537,350

JIG CLAMP ARRANGEMENT

James J. Hunt, Harvey, Ill., assignor to Pullman-Standard Car Manufacturing Company, Chicago, Ill., a corporation of Delaware Application October 12, 1946, Serial No. 703,044

12 Claims. (Cl. 113—99)

This invention relates to a jig for supporting the various posts, side sill, belt rail, window header and side plate of a railway car side frame in position for assembly and to mechanism for clamping such framing members in assembled relation for welding into an integrated whole.

The invention contemplates a side frame jig which is universally adjustable for adaptation to the various frame assemblies required by the different window arrangements prescribed by the floor plans of the particular vehicles with which they are to be associated and which may readily be adjusted to specific side frame arrangement in a minimum of time with the least effort, and which insures absolute alignment of the various framing members in the setting up of the assembly for welding.

An important object of the invention lies in the provision of a jig arrangement for the setting up of car side frames for welding operations whereby all of the horizontal longitudinal members of the side frame may be continuous from end to end and the vertical post members disposed in sections therebetween, with the completed frame assembly presenting flush outer and inner surfaces for the attachment of sheathing and finish elements.

The principal object of the invention is realized in the provision of vertically adjustable frame supporting brackets on horizontally adjustable jig members whereby to accommodate any type of side frame, and adapted to the setting up of frame structures having continuous longitudinals and discontinuous vertical posts and having highly effective but easily actuated securing devices for releasably holding the framing members in welding position.

Specifically, the invention has for one of its objects to provide a clamp bracket adjustably mounted on the jig, and including locators for positioning the framing members and having a readily actuated clamp member for holding the frame members in welding position and which is instantly applicable and releasable.

A still further object of the invention provides a clamping device exerting equalizing pressures in a plurality of directions on the framing members for drawing them up and aligning the various parts for subsequent welding operations.

Another object of the invention comprises a combined locator bracket and equalizer clamping device, including gauge means on certain of the brackets for relieving stresses thereon due to shrinkage in the frame after welding, and thereby to enable the ready removal of the completed frame assembly from the jig.

The foregoing and other objects of the invention are attained by the arrangement illustrated in the accompanying drawings, in which—

Fig. 1 is a general front elevational view of the jig structure in which the invention is incorporated and showing the vertical supporting posts mounted upon foundation members embedded in the floor and having longitudinal members extending full length thereof upon which the movable jig posts are mounted for adjustment longitudinally of the jig in accordance with post spacing requirements of the car side frame to be welded. The upper longitudinal includes a cambering beam for automatically incorporating the proper camber in side frames fabricated thereon;

Fig. 2 is a general view of a railway car side frame of the type fabricated on the jig of Fig. 1 and showing the arrangement of the longitudinal members of the frame extending continuously full length thereof, including the flanges with the vertical post members comprised of short sections disposed in vertical alignment between the respective longitudinals and having their flanges cut away to accommodate the flanges of the longitudinals, with the whole assembly integrated by welding;

Fig. 3 is a top plan view of a pair of the movable jig posts with the clamp brackets in position thereon supporting a car side frame to be welded, which is broken away in parts to reveal the application of the clamps to the vertical post sections, and showing the post members bearing against the projected gauge means which may be retracted after the welding operations to permit ready removal of the completed frame from the jig;

Fig. 4 is an end elevational view of the jig illustrated in Fig. 1 showing the dual arrangement of jig frames in back-to-back relationship, with the adjustable jig posts movably supported on the longitudinal members of the jig and indicating the adjustment holes for the attachment of the clamp brackets, which have been omitted in this view;

Fig. 5 is a view of the upper portion of one of the jig posts with the clamp brackets installed, and illustrating the equalizing clamps holding the various members of a car side frame in position on the locator elements for welding, and showing the gauge devices projected to provide the clearances between the frame members and the locators necessary to the ready removal of the completed frame from the locators when, due to shrinkages after welding, the frame tightens up on the supporting brackets, whereupon the gauge members may be retracted to relieve the stresses imposed upon the jig members and thus ease the removal of the frame;

Fig. 6 also illustrates the upper portion of a jig post assembly and comprises a section through the web of the post taken on the line 6—6 of Fig. 5 and showing a rear view of the clamp brackets, more clearly to reveal the attachment of the combined locator and clamp brackets to the jig post, and also showing the manner of pivotally mounting the clamp members on the brackets for ready application to the work and quick release;

Fig. 7 is a view complemental to Fig. 5 showing the lower portion of the jig post with the clamp brackets assembled thereon and the clamps operatively engaging the side frame structure to maintain it in welding position. In this view it will be noted that the horizontal frame members are disposed below the respective locator brackets, wherefore the gauge means, as provided for the upper horizontal members is unnecessary at the lower positions, since, when the upper gauge devices are released, proper clearance will automatically be provided at the lower members by the dropping of the frame;

Fig. 8 also illustrates the lower portion of the jig post assembly and is complemental to Fig. 6 but comprises a section through the web of the post taken on the line 8—8 of Fig. 7 and showing a rear view of these clamp brackets;

Fig. 9 is a fragmentary detail view of an upper jig post portion and clamping bracket assembly similar to Fig. 5, with portions broken away to reveal the functioning of the gauge device supporting the upper horizontal side frame member on the locator bracket, with the gauge projected to its frame supporting position and the equalizing clamp simultaneously exerting securing pressure on the frame member against the gauge and the end of the locator bracket;

Fig. 10 is a view similar to Fig. 9 but showing the gauge member retracted and the clamping device in released position, wherein it will be seen that ample clearance is then provided between the side frame and locator bracket;

Fig. 11 is a detail side view to larger scale of the equalizing clamp showing the double acting equalizing member and the actuating lever therefor;

Fig. 12 is a detail end view of the clamp showing the double plate construction thereof with the equalizer and actuating lever disposed therebetween; and Fig. 13 is a fragmentary detail sectional view of the clamp taken on the line 13—13 of Fig. 11 clearly revealing the double plate construction with spacing separators secured therebetween.

Figure 4:
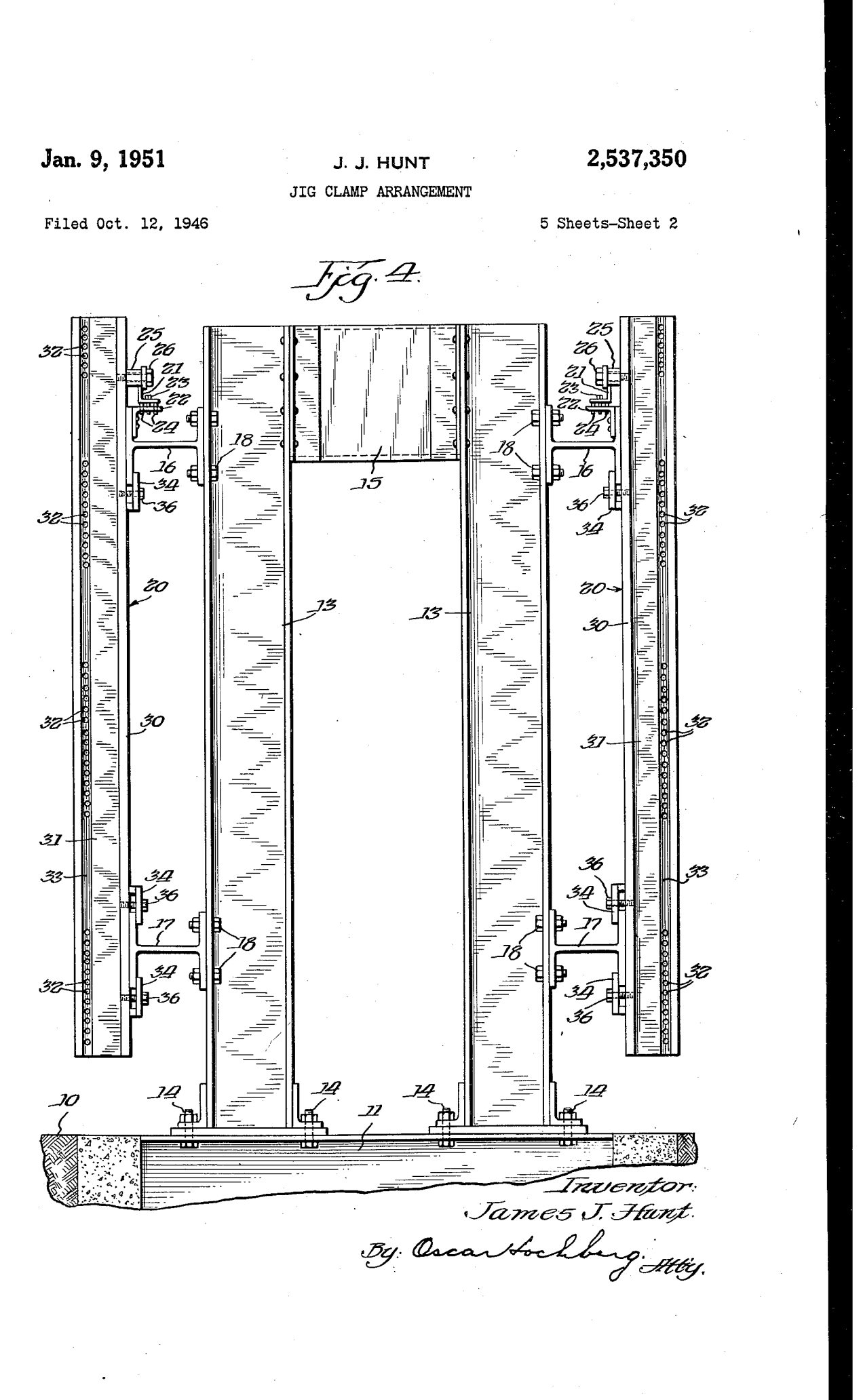

In the drawings, looking at Figs. 1 and 4, 10 indicates the floor of a shop in which the jig of this invention is installed. Disposed at intervals corresponding to the spacing of the upright supporting members of the jig, foundation members 11 for the uprights are mounted in the floor, embedded in cement 12 to provide a solid and substantial foundation for the jig. The upright jig frame members 13 are secured to the floor members 11 in spaced relation by means of bolts 14 and are rigidly braced at their upper ends by framework 15 extending between and secured to each pair of uprights by means of rivets, as shown. The uprights thus disposed provide for the arrangement of a pair of jig structures in back-to-back relationship for the accommodation of two side frame assemblies for welding at the same time. The jig structure is coextensive with the full length of the car side frames to be assembled thereon and the uprights 13 are disposed at spaced intervals throughout this length for the support of upper and lower longitudinal jig members 16 and 17 disposed at the respective sides of the dual jig structure. The longitudinals are secured to the upright members 13 by means of bolts 18 and are continuous throughout the full length of the jig to provide tracks or rails upon which the movable jig posts 20 are adjustable longitudinally of the jig.

The upper longitudinals 16 are each provided with a cambering beam for automatically insuring the proper camber in the completed side frames, assembled on the jig by vertical adjustment of the various movable jig posts as they are moved to their respective locations on the jig in accordance with the spacing of the side posts in the car frame to be assembled. The cambering beam proper comprises an angle member 21 extending continuously full length of the upper rail and supported therefrom in a manner providing for vertical adjustment thereof to varying heights throughout its length. A second angle member having a horizontally disposed upper flange 22 is rigidly secured to the upper rail member 16 of the jig by means of rivets to provide a fixed supporting base for the cambering beam. The cambering beam angle 21 is secured to the horizontal flange 22 of the supporting angle by means of stud bolts 23 which are disposed at intervals along the whole length of the beam and function to draw the cambering member downwardly toward the supporting member 22. The camber to be installed in the beam 21 is set initially by means of set screws 24 entered at intervals through the flange 22 of the supporting member to press the cambering beam upwardly from the support in varying degrees along the length of the beam to provide the required camber. The stud bolts 23 and set screws 24 function cooperatively and are disposed in sets having a stud bolt between a pair of set screws at each position. It will be seen that by withdrawing the set screws and then drawing the stud bolt down at any one position, or conversely by releasing the stud bolt and tightening up the set screws, the cambering beam may be drawn down toward the support 22 or forced upwardly therefrom, and by graduating the amount of this adjustment at the various positions, any degree of camber desired may be installed in the beam.

The movable jig posts 20 are suspended from the cambering beam 21 by means of rollers 25 for adjustment longitudinally of the jig in accordance with post spacing requirements of the car side frame so that with the desired camber initially installed in the beam, any movement of any of the jig posts in either direction will always be in accordance with the desired camber, and regardless of where the various posts may be finally located on the jig, they will all be automatically set to provide the camber prescribed for the car side frame to be assembled. The roller 25 supporting each post 20 from the cambering beam is flanged to provide for proper tracking on the beam 21 during adjustment of the post longitudinally of the jig and is mounted on an axle formed by a headed stud bolt 26 threaded into the jig post and having a shoulder for limiting the entrance of the bolt into the post to prevent binding of the roller.

The jig posts 20 are T-shaped in cross section having a base portion 30 adapted to seat against the face of the longitudinal upper and lower beams 16 and 17 of the jig frame and an outstanding web portion 31, to the outer margins of which the vertically adjustable clamp brackets of this invention are adapted to be secured. Vertically spaced groups of holes 32 are provided in the web portions of the posts for the reception of attaching bolts securing the brackets to the post and afford a range of adjustment for the respective brackets in the areas on the post in which they are to be located. The adjustment holes are vertically aligned and are located in keyways 33 extending the full height of the jig post at opposite sides of the web 31, and with which the brackets are adapted to interlock. The base flange 30 of the jig post bears against the face of the upper and lower longitudinals 16 and 17 and the post is fixedly secured thereto in its finally adjusted position by means of clamping plates 34 engaging the longitudinals and secured by bolts 36 threaded into the jig posts. These attachments 34, fix the positions of the movable posts on the jig until such time as it is desired to adjust the posts to different longitudinal positions on the jig, whereupon the bolts 36 must be loosened to release the clamping plates whereby to shift the posts and then reapply the fastenings.

From an examination of Fig. 2, it will be noted that all of the longitudinal framing members of the car side frame are continuous from end to end, and the vertical side post members are comprised of short sections disposed in vertical alignment and extending between the respective longitudinals, and the whole assembly integrated by welding. The jig clamping arrangement of this invention is peculiarly adapted to the fabrication of car side frames in which all of the longitudinal members, including the side sill, belt rail, window header and side plate are continuous and extend in one piece from end to end. In the present arrangement, the longitudinals are supported in front of the jig posts on locator brackets to which they are clamped, and the vertical side post sections are supported therebetween on similar combined locator and clamping brackets, whereby the side frame as a whole is disposed outside the area of the jig posts so that the longitudinal members in their continuity may extend past all of the jig posts, as best indicated in Fig. 3.

All of the framing members except the body corner posts are comprised of Z-bars, and looking at Fig. 2, it will be seen that the side frame is comprised of the continuous longitudinal members, including the side sill 40, belt rail member 41, window header 42, and the side plate 43, with the side post sections 44 disposed between the various longitudinals in vertically aligned relation. The various framing members are all disposed in the same plane, and in order to provide for the unbroken continuity of the flange portions of the longitudinal members 40, 41, 42 and 43, coextensive with their respective web portions, the inner and outer flanges of the vertical post sections 44, being disposed in the same planes with those of the longitudinals, are cut away to permit passage of the respective continuous longitudinal flanges. The post sections thus are formed to interfit with the longitudinals, and the joints are all continuously welded, with the webs of the post members welded to the webs of the longitudinals and the flanges of both welded to each other. All of the intermediate side posts are formed in sections welded between the longitudinal members, but at the ends of the side frame, the corner post 45 and the body corner post 46, at the vestibule end of the vehicle, are continuous and extend full height of the side frame. At the corner post 45, all of the longitudinal members stop at the post, to which they are welded, but at the vestibule end, the side plate 43 extends beyond the body corner post 46 for connection with the vestibule end frame (not shown) while the remaining longitudinals stop at the corner post, all of the members being securely welded.

All of the combined locator and clamp brackets for positioning the various framing members on the jig and holding them for the subsequent operations of welding the entire frame into an integrated unit, are of four general types. All of the brackets for positioning and clamping the vertical post sections 44 are substantially similar and comprise one type. The brackets for positioning and clamping the side plate 43 comprise a second type. Those for positioning and clamping the window header 42 comprise the third type, and the brackets for positioning and clamping the belt rail 41 and those for the side sill 40 comprise the fourth type. All of the brackets function in identically the same manner insofar as the positioning and clamping of the various frame members are concerned, and differ only in their manner of application to the jig posts and in their relation to the side framing members—some of them functioning above the framing members, some below, and others to one side.

Of the six brackets on each jig post for positioning and clamping the vertical post sections 44, the four brackets 50, 52, 53 and 55, disposed respectively at the lower end of the lowermost post section, at the lower and upper ends of the intermediate post section and at the upper end of the uppermost post section are all exactly alike, and therefore a description of any one will apply equally to the others. Each of these brackets comprises a base portion 56 adapted to be removably attached to the web 31 of the jig post 20 with an integral key 57 interlocking with the keyway 33 (see Fig. 3) and secured by a bolt 58 entered any one of the holes 32 in the jig post, depending upon the adjusted position desired for the bracket, and passing through a slotted opening 59 in the bracket which provides for the final and exact adjustment thereof. The base portion 56 is provided with an extension 60 beyond the face of the jig post and which is machined to provide exact locating surfaces for the post sections 44. This location 60 is provided with a vertically extending kerf 61, and a plunger gauge is mounted in the locator to have its head portion 62 normally retractible into the kerf. The gauge includes a plunger or shank portion 63 passing through the locator directly in the kerf portion, with a spring 64 coiled thereabout, behind the locator, adapted to retract the gauge when the elongated head portion 62 is disposed parallel to the kerf. An operating handle 65 is provided at the end of the plunger, and against which the spring 64 is adapted to engage to retract the gauge.

Assuming the gauge to be retracted, with the head 62 seated in the kerf 61, substantially flush with the surface of the locator, it will be seen that by compressing the spring 64 and rotating the plunger 63 through the medium of the handle 65 approximately ninety degrees, the head will be projected and turned across the kerf to be supported on the surface of the locator. This is the normal operative position of the gauges when setting up a car side frame for welding operations, so that the post sections 44, when clamped to the locators, find bearing against the outer end surfaces of the locator and against the surfaces of the head portions 62 of the gauges, as best shown in Fig. 3, with the web of the Z-shaped post sections bearing against the gauges and the outer flange against the end of the locator. It will be seen, also, as shown in Fig. 3, that adjacent post assemblies bear against the locators in opposing directions, so that due to shrinkages in the side frame as a result of the welding operations, stresses are set up causing the posts to draw more tightly into engagement with the locators. When the frame is completed and it is desired to remove it from the jig, these stresses and the resultant high coefficient of friction, which otherwise would make removal of the frame extremely difficult, may be relieved by rotating the gauge members 90° by means of their operating handles, whereupon the springs 64 will retract them into the kerfs 61 so that clearance is thus provided at each post assembly to the extent of the thickness of the gauge heads 62, thereby to enable the frame to be lifted free of the jig without any binding whatever.

The base portion 56 of the brackets and the extension portion 60 beyond the face of the jig post comprising the locator for positioning the framing post sections 44 are integral and comprise a single rigid element adapted to be secured to the jig post for adjustment vertically within the range afforded by the various groups of adjustment holes 32 in combination with the elongated opening 59 through which the attaching bolt 58 extends. Adjacent the bottom of the base plate 56, a shelf-like clamp supporting bracket 66 is rigidly secured thereto by welding and is disposed entirely to the inner side of the area occupied by the side frame members when clamped in position on the jig, as best shown in Figs. 5 and 7. The bracket 66 is provided with a fixed upstanding pivot pin 67 rigidly secured thereto by welding and which acts as a mounting for the clamp securing the framing members to the locator brackets, as more fully hereinafter described. An upwardly directed flange 68 defines the outer extremity of the supporting bracket and acts to confine the operative position of the clamping member. An adjustable stud 70, adapted to be set by a locknut 69, is entered through the flange 68 and provides a back-up member for the securing clamp which may be adjusted in accordance with the operative position required for the clamp and against which the reaction of the clamp is received in the operation of clamping the framing members against the locators.

The combined locator and clamping bracket 51, disposed adjacent the upper end of the lowermost post section 44 immediately beneath the belt rail member 41, is exactly like the brackets 50, 52, 53 and 55 just described except that the locator portion 60 is of less vertical extent. As best shown in Fig. 7, the locator extension 60 on this bracket is cut away at the upper side, as at 71, to provide clearance for the belt rail 41, the lower flange of which fits directly into the space thus provided. The bracket 54, disposed at the lower end of the uppermost post section 44 adjacent the belt rail 42, also is similar to those just described, and like the bracket 51, is cut out to clear one of the longitudinal framing members, but differs further from those brackets in that the clamp supporting bracket 66 is secured at a higher position on the base portion 56 in order to dispose the clamp member above the upwardly directed flange of the longitudinal window header member 42, which, as best shown in Fig. 5, is fitted directly into the space afforded by the cut out portion 72 at the underside of the locator extension 60. The attaching bolt 58 for securing this bracket to the jig post 20 is disposed below the clamp supporting portion 66, whereas on each of the other brackets it is disposed above this member. All of the six brackets described are alike in that they each have the locator 60 integral with the base member 56 and the clamp supporting shelf 66 welded to the base portion, with the adjustable backstop 70 for the clamp entered through the upstanding flange 68, and each of them is equipped with the retractible gauge member 62 against which the post sections 44 bear.

The combination locator and clamping brackets 75, 76, 77 and 78 for the longitudinal framing members 40, 41, 42 and 43 respectively, also are secured to the jig post 20 for supporting these members directly in alignment with the post sections 44 for welding operations. These brackets, against which the longitudinal frame members are clamped, differ from those for the vertical post sections in that they are arranged for swinging movement of the clamp member in a vertical plane about a horizontal axis as distinguished from the horizontal swinging of the post clamping members. The locator member of each bracket is not integral with the base portion but comprises a separate element welded to the base portion. The clamp member is supported from a pivot mounted directly on the base portion without the necessity of a supporting shelf as provided on the post clamping brackets. Certain of the brackets are adapted to clamp the longitudinals from below, with the locator element disposed above the frame members, while others are adapted to clamp certain of the longitudinals from the upper side, with the locator supporting the frame members from the under side. The clamping brackets having the locator element disposed above the framing members are not provided with the retractible plunger gauges of the post clamping members, but those brackets having the locator element in supporting relation beneath the framing members are equipped with gauge members exactly like the gauges used for the vertical post sections and for the same purpose of relieving any binding on the jig due to stresses resulting from shrinkage in the frame as a consequence of the welding operations.

The brackets 75 and 76 against which the side sill 40 and the belt rail 41 are clamped are exactly alike, as best shown in Fig. 8, and each includes a base plate 79 having a vertically extending integral key 80 adapted to interlock with the keyway 33 in the jig post 20 at the opposite side from the post clamping brackets. An outwardly directed flange 81 defines the lower extremity of the base plate and serves to confine the operation of the clamp member within the range desired. The bottom flange affords a means of backing up the clamp member mounted on the bracket through the medium of an adjustable backstop like those used on the post clamping brackets and comprising a stud 70 threaded through the flange in position to engage the clamp member at a point whereby, in the operative position of the clamp, to receive the reaction therefrom resulting from the operation of clamping the framing members against the locators. The stud 70, being threaded, is infinitely adjustable and may be set in the operative position required for the clamp by means of locknut 69.

A horizontally disposed pivot pin 82, upon which the clamp member is mounted, is welded into the base portion 79 at a location below the level of the framing members 40 and 41, whereby the clamp is operative in an upward direction to secure the framing members against the locators. In the operative position, the clamp member is maintained in spaced relation to the base portion by means of a spacing member in the form of a separate metal block 83 welded to the base portion (see Fig. 8). The bracket 75 is secured to the jig post 20 by means of an attaching bolt 84 entered through one of the adjustment holes 32 at the lower part of the post and passing through the slot 86 in the base portion 79, which, in combination with the adjustment holes, provides for the same accurate and close adjustment of the bracket as is the case with the post supporting brackets. The bracket 76 has this same adjustment slot but is secured to the jig post by the same attaching bolt 58 as secures the post supporting bracket 51. The locator member 85 comprises a separate element from the base member and is secured to the base member adjacent the upper end thereof by welding. The locator on each bracket extends beyond the face of the jig post 20 for engagement thereof by the longitudinal framing members and is so located as to be disposed above the respective framing members so that the clamping of such members thereagainst is performed from the underside. The surfaces of the locator contacted by the framing members are machined to provide for accurate positioning of the framing members in alignment with other members of the side frame for subsequent welding operations.

The combined locator and clamping bracket 77 for the window header 42 is similar to the brackets 75 and 76 but is secured to the jig post 20 in an inverted position so that the locator 85 is disposed at the lower end of the base member 79 for engagement beneath the window header member in supporting relation thereto, and the clamp mounting portion of the bracket including the pivot pin 82, spacer block 83, and the confining flange 81, with the adjustable backstop 70, is disposed upwardly above the level of the window header member with the clamp member operating in a downward direction in clamping the framing member over the locator. The integral key 80 interlocks with the keyway 33 in the jig post in the same manner as the brackets 75 and 76, and the bracket 77 is secured to the jig post by the same attaching bolt 58 securing the bracket 54 with the same means of final adjustment comprising the slot 86 in the base 79, through which the bolt passes.

The bracket 77 differs from the members 75 and 76 in that the locator 85 is provided with the same type of retractible plunger gauge as the post clamping brackets 50, 51, 52, 53, 54 and 55 for releasing the frame from the jig after welding. A kerf 87 is provided across the upper surface of the locator in the area engaged by the web of the member 42 for the reception of the gauge head 62 when in retracted position, but which is turned across the kerf in the normally operative projected position for supporting the framing member clear of the locator surface, as indicated in the drawings. When the gauge is retracted, ample clearance is provided to allow for shrinkage in the side frame from the heat of welding without any binding action on the jig, whereby the frame may readily be removed. It will be noted that only the brackets 77 and 78 are provided with these retractible gauges since, when all of the clamping devices on the entire jig are released for removal of the complete side frame, the locators 85 on the upper brackets 77 and 78 constitute the sole support for the frame which rests directly on the gauge heads 62, and when the gauges are retracted, the frame gravitates to a lower position, thus falling away from the locators on the lower brackets 75 and 76 which are disposed above the frame members 40 and 41, thus eliminating the need for gauge means at these locations. The gauge members are retracted in the same manner as those on the post clamping brackets, by rotating the gauge ninety degrees to a position parallel with the kerf, whereupon the spring 64 about the plunger 63 causes the gauge head 62 to be drawn into the kerf. The spring functions between the operating handle 65 on the plunger and the bottom surface of the locator 85 through which the plunger passes.

The combination locator and clamping bracket 78 at the upper end of the jig post for the side plate 43 is like the bracket 77, including the provision of retractible gauge means, but the base plate 79 is extended downwardly as at 88 for securement to the jig post by the same attaching bolt 58 securing the uppermost post clamping bracket 55. A second attaching bolt 89 secures this bracket to the jig post above the level of and independently of the bracket 55. Slots 86 are provided in the base plate 79 at both of these bolts for accurate adjustment of the bracket on the jig post.

All of the brackets on the jig, including those for the vertical post sections and those for the longitudinal framing members, utilize the same type of clamping device for releasably securing the various frame members on the locators, and which are adapted to exert equalizing pressures on the various members in a plurality of directions to insure correct positioning of the related frame elements with the web portions thereof in engagement with the upper or lower surface of the locators, as the case may be, or with the side surface in the case of the post locators, and with the flanges of all of the Z-shaped frame elements bearing against the ends of the locators. The clamp 100 per se is illustrated in detail in Figs. 11, 12 and 13 and comprises a built-up assembly fabricated by welding and shaped to provide for the application of equalizing forces in a plurality of directions. The clamp is composed of a pair of flat plates 101 spaced apart by separator blocks 102 and 103 which are sandwiched between the plates and integrally secured by welding. The flat plates are disposed in parallel relation and are shaped to provide a relatively narrow portion 104 adjacent the pivot end of the clamp and a wide end portion 105 for the accommodation of the equalizing pressure mechanism. The spacer block 102 is circular and is disposed at the rounded pivot end of the clamp, while the block 103 is rectangular and disposed at a point intermediate of the length of the clamp and representing substantially the extent of the narrow portion 104, and at the other side of this latter block the clamp flares at one side toward the wide end 105. A pivot opening 106 is provided at the rounded pivot end, extending through both plates 101 and the spacer block 102, and which is adapted to fit over the respective pivot pins 67 or 82 on the various clamping brackets where the clamp is removably secured by cotter keys 90. The spacer block 103 is disposed flush with the edges of the plates 101 at a point on the clamp adapted to bear against the backstop 70 on the supporting bracket.

The equalizer pressure mechanism comprises an equalizer 107 and an actuating cam 108 mounted in the wide end of the clamp. The equalizer 107 is floatingly mounted in the flared portion of the wide end and is disposed at an angle for engagement with the framing members at two sides, as hereinafter will appear. The equalizer is a substantially U-shaped flat metal member having spaced leg members 109 and 110 engageable respectively with the web of the various framing members with which it may be associated and with the outer flange thereof, and is disposed between the plates 101 in such relation to the cam 108 as to be projected outwardly upon actuation thereof. The equalizer is mounted between a pair of spacer elements 111 extending between the plates 101 and secured by rivets 112 and which are engageable with corner projections 113 on the equalizer to limit outward movement thereof and so that, with the cam 108 in place, the equalizer is prevented from coming out of position between the plates 101 in any direction. The cam 108 is pivotally mounted behind the equalizer 107 on a fastening 114 for operative engagement with the rear surface of the equalizer member and is actuated by means of an operating handle 115 to rotate the cam and thereby press the equalizer into engagement with the work.

The clamp described affords the utmost speed in assembling car side frames upon the jig and is of the greatest simplicity in operation and the movements necessary, and the effort required to engage the clamp with the work is reduced to an absolute minimum to facilitate the erection of side frame assemblies on the jig, and it will especially be noted that all of the clamps are disposed entirely out of the way of the welding operations between the various framing members. In operation, the clamps 100 are pivotally mounted on the pivot pins 67 or 82 of the various brackets, and which it will be noted are of greater length than the height of the flanges 68 or 81 on the brackets so that the pins project beyond the flanges, whereby the clamps may be shifted to positions clearing the flanges to enable the clamps to be swung freely between fully released positions out of the way of the framing members and positions operatively to engage the frame members upon actuation of the operating handle 115 pressing the equalizer 107 against the work. In this manner it is possible, when preparing a side frame for welding, to have all of the clamps 100 out of engagement with the backstops 70 and swung to fully released positions, and then as the individual side frame elements are placed on the locators, the clamps may be quickly swung into operative positions, backed up by the adjusted backstops 70 and the handles 115 manipulated to actuate the cams 108 which cause the equalizers 107 to bear against the frame members and thereby draw them up tightly against the locators for accurate positioning on the jig. In this way the entire side frame may be set up on the jig for welding in a minimum of time and in accurate alignment with the least effort.

In the actual operation of the arrangement, the jig posts 20 are first adjusted longitudinally of the jig in accordance with the spacing requirements of the posts 44 in the side frame to be welded, and since the jig posts are all suspended from the cambering beam 21, they will automatically be positioned to provide the correct camber in the side frame regardless of their adjusted location on the jig. The locator brackets, 75, 76, 77 and 78 are adjusted vertically on the various jig posts in accordance with the vertical spacing desired for the longitudinals 40, 41, 42 and 43 and the supporting brackets 50, 51, 52, 53, 54 and 55 for the post sections adjusted in pairs therebetween. The gauge members 62 are all disposed in their projected positions, and the various framing elements then assembled upon the locators. As the individual frame members are placed on the jig, the clamps 100 are disposed in their operative positions clamping the members to the locators, and after the frame members are clamped in position, the gauges 62 may be retracted to provide for shrinkage in the side frame resulting from the welding operations. After the side frame is completed, it may be removed from the jig as a unit by means of suitable crane and lifting attachments provided for the purpose and assembled with the girder side.

From the foregoing, it will be seen that a highly efficient and easily operated arrangement has been provided for assembling car side frames for welding operations.

What is claimed is—

1. For use in a jig arrangement including a jig post for assembling and welding vehicle side frames, a frame supporting bracket comprising a base plate adapted to be secured to the jig post, a locator member extending laterally from the base plate for engagement with a frame member, a pivot trunnion, and a clamp member pivotally mounted on said trunnion for releasably securing said frame member against said locator, a back-up portion on said base plate confining the clamp member, said trunnion member extending beyond said back-up portion whereby the clamp member may be shifted to swing clear of such portion, said clamp having a floating equalizer engageable on two sides of said frame member for drawing the frame member tightly against said locator, and a lever on the clamp for actuating said equalizer.

2. A jig clamp arrangement comprising a supporting bracket including a base plate, a locator member projecting from the base plate, a pivot trunnion on the bracket, a clamp member pivotally mounted on said trunnion for releasably securing a workpiece against the locator, a back-up portion on the bracket confining said clamp member, said trunnion member extending beyond said back-up portion whereby the clamp member may be shifted to swing clear of such portion, said clamp having a floating equalizer engageable with said workpiece to draw the workpiece tightly against said locator, and a cam-lever member on the clamp having an operating handle for actuating said equalizer.

3. For use in a jig arrangement including a vertical jig post for assembling and welding vehicle side frames upon which jig post the side frame members are adapted to be supported: a plurality of frame supporting brackets adapted to be mounted on the jig post for clamping the frame members each comprising a base plate attachable to the jig post, a locator member projecting from the base plate for supporting engagement with a frame member, a horizontal pivot trunnion on the base plate, and a clamp member mounted on the trunnion for pivotal movement in a vertical plane adapted releasably to secure said frame member against the locator, a back-up portion on the base plate confining said clamp member, said trunnion member extending beyond said back-up portion whereby the clamp member may be shifted to swing clear of such portion, certain of said clamp members being engageable above the respective frame members and certain of them engageable below the frame members, each of the clamp members having a floating equalizer engageable with the respective frame members to draw the frame members tightly against said locators, said frame supporting brackets including a clamp member engageable above a frame member each having a retractible gauge member engageable beneath said frame member, and a cam-lever member on each of the clamp members for actuating said equalizers.

4. For use in a jig arrangement including a vertical jig post for assembling and welding vehicle side frames upon which jig post the side frames are adapted to be supported: a frame supporting bracket adapted to be mounted on the jig post for clamping a frame member and comprising a base plate adapted to be secured to the jig post, a locator member projecting from the base plate for engagement with said frame member, a vertical pivot trunnion on the bracket, and a clamp member mounted on said trunnion for pivotal movement in a horizontal plane adapted releasably to secure said frame member against said locator, a back-up portion on the base plate confining said clamp member, said trunnion member extending above said back-up portion whereby the clamp member may be lifted to swing clear of such portion, said clamp member having a floating equalizer engageable with said frame member to draw the frame member tightly against said locator, and a cam-lever member on the clamp member for actuating said equalizer.

5. For use in a jig arrangement for assembling and welding vehicle side frames and including a jig post: a locator bracket comprising a vertical base plate, a pivot trunnion projecting from the base plate, a clamp member pivotally mounted on the trunnion adapted to secure a side frame member to said locator bracket, an equalizer between the clamp member and said frame member, means for actuating said equalizer, spacer means between the clamp and base plate, a flange on the base plate backing up the clamp, an adjustable stop between the flange and said clamp, said trunnion being of greater length than said flange whereby the clamp may be shifted to swing clear of the flange, a locator member extending from the base plate for engagement with a member of a side frame, a retractible plunger gauge member on the locator engageable in projected position with the side frame member, and releasable attaching means adapted to secure said bracket to the jig post.

6. For use in a jig arrangement for assembling and welding vehicle side frames and including a jig post: a locator bracket comprising a vertical base plate, a pivot trunnion projecting from the base plate, a clamp member pivotally mounted on the trunnion adapted to secure a side frame member to said locator bracket, an equalizer between the clamp member and said frame member, means for actuating said equalizer, a flange on the base plate backing up the clamp, said trunnion being of greater length than said flange whereby the clamp may be shifted to swing clear of the flange, a locator member extending from the base plate for engagement with a member of a side frame, a retractible plunger gauge member on the locator engageable in projected position with the side frame member, and releasable attaching means adapted to secure said bracket to the jig post.

7. For use in a jig arrangement for assembling and welding vehicle side frames and including a jig post: a locator bracket comprising a base plate adapted to be secured to the post, a pivot trunnion projecting from the base plate, a clamp member pivotally mounted on the trunnion adapted to secure a side frame member to said locator bracket, an equalizer between the clamp member and said frame member, means for actuating said equalizer, a flange on the base plate backing up the clamp, said trunnion being of greater length than said flange whereby the clamp may be shifted to swing clear of the flange, a locator member extending from the base plate for engagement with a member of a side frame, and a retractible plunger gauge member on the locator engageable in projected position with the side frame member.

8. For use in a jig arrangement for assembling and welding vehicle side frames and including a jig post: a locator bracket comprising a base plate adapted to be secured to the post, a back-up flange on said base plate, a pivot trunnion projecting from the base plate, a clamp member pivotally mounted on the trunnion adapted to secure a side frame member to said locator bracket, an adjustable backstop between said clamp member and said back-up flange, said trunnion being of greater length than said flange whereby the clamp may be shifted to swing clear of the flange, an equalizer between said clamp member and said side frame member, a locator member extending from the base plate for engagement with a member of a side frame, and a lever member for actuating said equalizer.

9. For use in a jig arrangement for assembling and welding vehicle side frames and including a jig post: a locator bracket comprising a base plate adapted to be secured to the jig post and having a locator member extending from the base plate for engagement with a side frame member, a horizontal supporting plate projecting from the base plate in a direction at an angle to the locator, an upstanding pivot trunnion on the supporting plate, a clamp member on the supporting plate pivotally mounted on said trunnion and adapted to secure said side frame member to the locator, an equalizer between the clamp member and said frame member, a flange on the supporting plate in back of said clamp, an adjustable stop on the flange engageable with the clamp, said trunnion being of greater height than said flange whereby the clamp may be shifted to swing clear of the flange, a retractible plunger gauge member on said locator engageable in projected position with said frame member, a releasable means for actuating said equalizer.

10. For use in a jig arrangement for assembling and welding vehicle side frames and including a jig post: a locator bracket comprising a base plate adapted to be secured to the jig post and having a locator member extending from the base plate for engagement with a side frame member, a supporting plate projecting from the base plate in a direction at an angle to the locator, a pivot trunnion on the supporting plate, a clamp member on the supporting plate pivotally mounted on said trunnion and adapted to secure said side frame member to the locator, an equalizer between the clamp member and said frame member, a flange on the supporting plate in back of said clamp, said trunnion being of greater length than said flange whereby the clamp may be shifted to swing clear of the flange, a retractible plunger gauge member on said locator engageable in projected position with said frame member, and releasable means for actuating said equalizer.

11. For use in a jig arrangement for assembling and welding vehicle side frames and including a jig post: a locator bracket comprising a base plate adapted to be secured to the jig post and having a locator member extending from the base plate for engagement with a side frame member, a supporting plate projecting from the base plate in a direction at an angle to the locator, a pivot trunnion on the supporting plate, a clamp member on the supporting plate pivotally mounted on said trunnion and adapted to secure said side frame member to the locator, a backstop on the supporting plate backing up said clamp member, an equalizer between the clamp member and said frame member, means actuating said equalizer, said clamp member being shiftable on said pivot trunnion clear of said backstop, and a retractible plunger gauge member on said locator engageable in projected position with said frame member.

12. For use in a jig arrangement for assembling and welding vehicle side frames and including a jig post: a locator bracket comprising a base plate adapted to be secured to the jig post and having a locator member extending from the base plate for engagement with a side frame member, a supporting plate projecting from the base plate in a direction at an angle to the locator, a pivot trunnion on the supporting plate, a clamp member on the supporting plate pivotally mounted on said trunnion adapted to secure said side frame member to the locator, an equalizer between the clamp member and said frame member, means actuating said equalizer, and a backstop on the supporting plate backing up said clamp member, said clamp member being shiftable on said pivot trunnion clear of said backstop.

JAMES J. HUNT.

REFERENCES CITED

The following references are of record in the file of this patent:

UNITED STATES PATENTS

| Number | Name | Date |
|---|---|---|
| 744,555 | Jacobs | Nov. 17, 1903 |
| 1,303,596 | Rifflard | May 13, 1919 |
| 1,549,251 | Geyer | Aug. 11, 1925 |
| 1,880,666 | Barnes | Oct. 4, 1932 |
| 1,893,456 | Sykes | Jan. 3, 1933 |
| 2,054,572 | McKenna | Sept. 15, 1936 |
| 2,165,322 | Weston | July 11, 1939 |
| 2,311,042 | Ferguson | Feb. 16, 1943 |
| 2,328,040 | Weightman | Aug. 31, 1943 |
| 2,342,179 | Ciesa | Feb. 22, 1944 |
| 2,421,973 | Trimble | June 10, 1947 |

FOREIGN PATENTS

| Number | Country | Date |
|---|---|---|
| 476,405 | France | May 10, 1915 |